June 20, 1933. C. L. EASTBURG 1,915,088
NUT LOCKING DEVICE
Filed Oct. 1, 1931

INVENTOR:
Clifford L. Eastburg,
by Carr & Carr & Gravely
HIS ATTORNEYS.

Patented June 20, 1933

1,915,088

UNITED STATES PATENT OFFICE

CLIFFORD L. EASTBURG, OF CANTON, OHIO, ASSIGNOR TO THE TIMKEN ROLLER BEARING COMPANY, OF CANTON, OHIO, A CORPORATION OF OHIO

NUT LOCKING DEVICE

Application filed October 1, 1931. Serial No. 566,198.

This invention relates to nut locks, particularly to devices for locking a cluster of nuts or screw heads arranged around an object that should be left unobstructed, such as, for example, a cluster of screw heads at the end of an axle equipped for an odometer drive.

The principal object of my invention is to provide a simple construction that locks a cluster of nuts firmly, that permits easy tightening and loosening of the nuts, and one that is arranged so that the space between the nuts is unobstructed by the locking device.

The invention consists in the nut lock, and in the parts, combinations and arrangements of parts hereinafter described and claimed.

In the accompanying drawing, which forms part of this specification, and wherein like reference numerals refer to like parts wherever they occur, Fig. 1 is a sectional view of an axle equipped for an odometer drive and having end plates held thereon by screws whose head portions are provided with a locking device embodying my invention.

Figure 1:
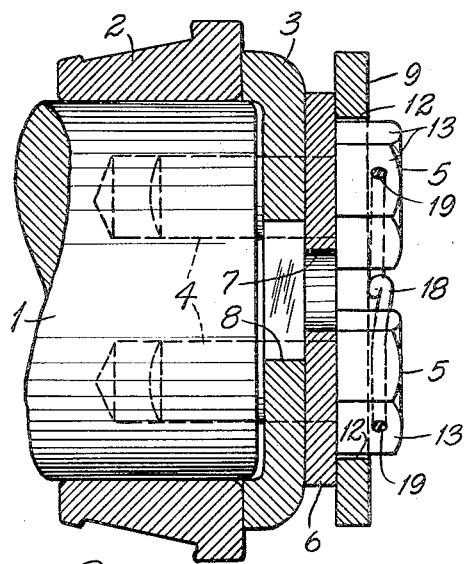

In the construction illustrated, an axle 1 is provided with an inner bearing member 2 at its end; and abutting against the outer end of the inner bearing member 2 is a securing plate 3 that is held on the end of the axle 1 by a cluster of four screws 4, having hexagonal heads 5. The end of the axle is equipped with odometer driving means in its center and interposed between the securing plate 3 and the hexagonal heads 5 of the screws 4 is an odometer chuck cover 6 provided with an opening 7 therethrough adjacent to another opening 8 through the securing plate for allowing insertion of the contact member of an odometer (not shown).

Figure 2:
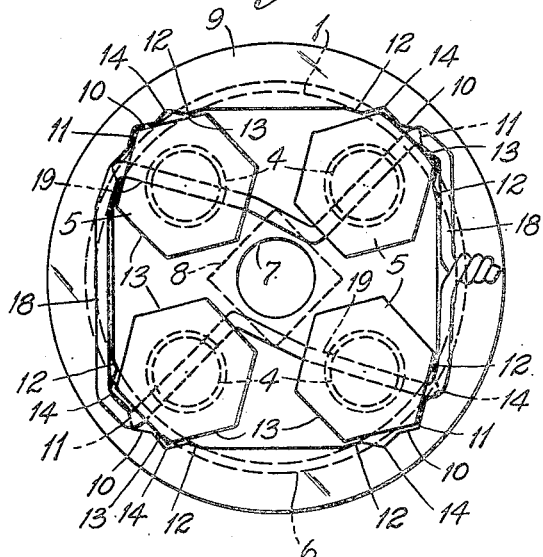
Fig. 2 is an end view of the axle, end plate, screws, and locking device.

My locking device comprises a metal ring 9 surrounding the cluster of screw heads 5 and having a set of angular notches 10 in its inner peripheral face located adjacent to the outer edge portion of each screw head, the angle of each notch being such as to accommodate one corner of a screw head. In Fig. 2, each set of notches comprises an angular notch 11 having each wall portion 12 of substantially the same length as one side 13 of a screw head 5, and each wall portion 12 is provided in the center with a notch 14 of such size and shape that three similar shaped notches are formed with the locus thereof being an arc of a circle concentric with the center of the screw head. Obviously, with the notches so arranged, a screw head may be held along two of its sides 13 as is the case of the screw heads shown on the upper left hand side of Fig. 2, or else, the head may be moved around 30 degrees from this position so as to be held along one outer side and a portion of the two adjacent sides as is the case of the screw heads shown on the upper right hand side of Fig. 2.

Figure 3:
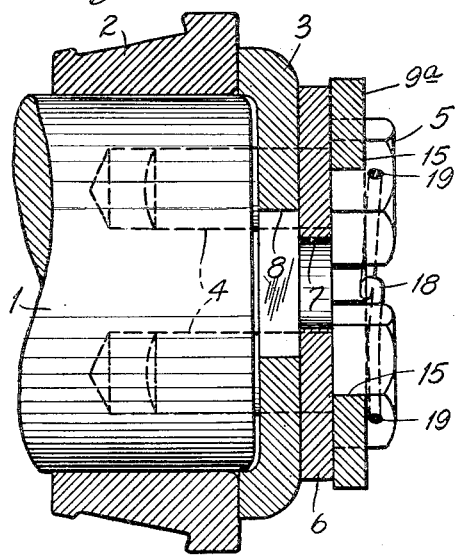
Fig. 3 is a sectional view similar to Fig. 1 showing a modified form of my locking device.
Figure 4:
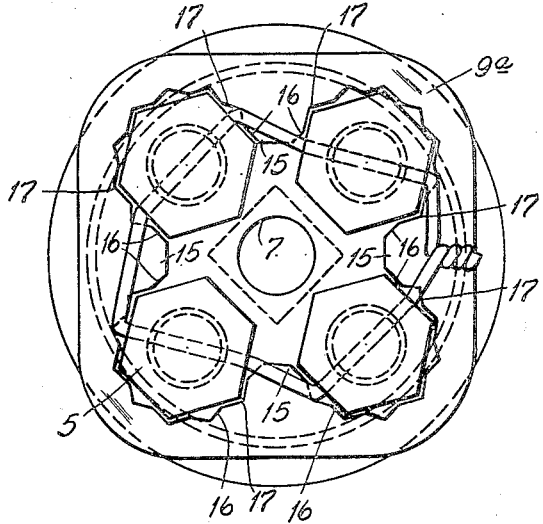
Fig. 4 is an end view of the construction shown in Fig. 3.

In the modification shown in Figs. 3 and 4, the locking ring 9a instead of having a straight inner face portion between each set of notches, is provided with an inwardly extending projection 15 between each screw head. The sides 16 of these projections taper toward each other at such an angle that the opposite sides of adjacent projections extend parallel to each other and define a comparatively deep recess in the ring for receiving a screw head; and in the center of each side 16 of the projections is an angular notch 17, the notches 17 being of such size and arranged in such manner that the locus of the notches are in the arc of a circle concentric with the center of the screw head. Obviously, with this form of locking ring, a screw head may be held along its four sides as is the case of the screw heads shown on the left hand side of Fig. 4, or else, the head may be moved around 30 degrees from this position so as to be held along three sides and a portion of each side adjacent to the end of these three sides as is the case of the screw heads shown on the right hand side of Fig. 4.

With both forms of my locking device, in order to prevent the locking member or ring from moving out endwise of the screws, a locking wire 18 is passed through the usual transverse bores 19 in the screw heads, said wire passing above the outer face of said locking member.

The hereinafter described locking device is easy to install and simple to construct since it may be readily made by punch press methods. It provides a lock position for each 30 degree angular movement of a screw head and it holds the screws in position firmly and leaves the space between them free and clear from obstructions, making it readily accessible for odometer attaching purposes and the like.

Obviously, the construction hereinabove described admits of considerable variations without departing from the spirit of my invention. For instance, while I have shown a locking device for a cluster of four nuts, it is possible to use my device for locking a cluster of any number of nuts; and as other variations may be desirable, I do not wish to limit my invention to the precise construction shown and described.

What I claim is:

1. A locking device for a cluster of nuts, screw heads, and the like, comprising a ring for surrounding said cluster and having a notch in its inner periphery adapted to engage two sides of a nut and extending the full length thereof and a notch in each side of said first mentioned notch for engaging one corner of a nut.

2. A locking device for a cluster of nuts, screw heads and the like having more than four sides, comprising a ring for surrounding said cluster and having a recess in its inner periphery whose sides are shaped to fit around four sides of a nut and an angular notch provided in each side of said recess for engaging the corner of a nut.

3. A locking device for a cluster of nuts, screw heads, and the like, comprising a ring for surrounding said cluster and having a notch in its inner periphery adapted to engage portions of two sides of a nut and a notch in each side of said first mentioned notch for engaging one corner of a nut.

Signed at Canton, Ohio, this 28 day of September, 1931.

CLIFFORD L. EASTBURG.